(12) United States Patent
Banatwala et al.

(10) Patent No.: US 9,734,323 B2
(45) Date of Patent: Aug. 15, 2017

(54) CONTROLLING WHICH USERS FROM AN ORGANIZATION ARE TO BE PART OF A COMMUNITY SPACE IN AN EASY AND ERROR-FREE MANNER

(71) Applicant: International Business Machines Corporation, Armonk, NY (US)

(72) Inventors: Mustansir Banatwala, Hudson, NH (US); David A. Brooks, Arlington, MA (US); David L. Durazzano, Hooksett, NH (US); Josef Scherpa, Fort Collins, CA (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 13/749,825

(22) Filed: Jan. 25, 2013

(65) Prior Publication Data

US 2014/0215353 A1 Jul. 31, 2014

(51) Int. Cl.
*G06Q 10/10* (2012.01)
*G06F 3/0481* (2013.01)
(Continued)

(52) U.S. Cl.
CPC ............ *G06F 21/45* (2013.01); *H04L 63/102* (2013.01); *H04L 63/104* (2013.01); *H04L 67/1044* (2013.01)

(58) Field of Classification Search
None
See application file for complete search history.

(56) References Cited

U.S. PATENT DOCUMENTS 6,742,032 B1 5/2004 Castellani et al.
7,676,542 B2 * 3/2010 Moser ................. G06Q 10/107
709/204

(Continued)

FOREIGN PATENT DOCUMENTS

WO 2012088457 A2 6/2012

OTHER PUBLICATIONS

Novell GroupWise 6.5 Windows Client User Guide, by Novell Inc., Sep. 19, 2005, pp. renumbered 1-13.*

(Continued)

*Primary Examiner* — Mahelet Shiberou
(74) *Attorney, Agent, or Firm* — Robert A. Voigt, Jr.; Winstead, P.C.

(57) ABSTRACT

A method, system and computer program product for controlling which users from an organization are to be part of a community space. A community collaboration mechanism provides a list of organizations authorized to collaborate with the organization of the user. The mechanism then receives from the user a selection of organizations from this list of organizations. Upon receiving indication(s) (e.g., e-mail addresses) of users to be added to the community space, the mechanism provides a list of users who are members of the user selected organizations to engage in a collaborative activity with the user based on these indication(s). The mechanism then receives a selection of users from this list of users and adds those users to the community space. In this manner, the user can control which users from an organization are to be part of a community space in an easy and error-free manner.

10 Claims, 5 Drawing Sheets

(51) Int. Cl.
*G06F 21/45* (2013.01)
*H04L 29/06* (2006.01)
*H04L 29/08* (2006.01)

(56) References Cited

U.S. PATENT DOCUMENTS

| | | | | |
|---|---|---|---|---|
| 8,423,905 | B2* | 4/2013 | Li | G06Q 10/10 705/7.13 |
| 2004/0122693 | A1* | 6/2004 | Hatscher | G06Q 10/06313 705/319 |
| 2005/0055306 | A1* | 3/2005 | Miller | G06Q 40/04 705/37 |
| 2007/0198647 | A1* | 8/2007 | Lingafelt | H04L 12/1822 709/207 |
| 2009/0144808 | A1* | 6/2009 | Dhananjaya | G06Q 10/10 726/4 |
| 2009/0192895 | A1 | 7/2009 | Gerichter et al. | |
| 2011/0004927 | A1* | 1/2011 | Zlowodzki | G06F 21/335 726/7 |
| 2013/0311222 | A1 | 11/2013 | Chaturvedi et al. | |

OTHER PUBLICATIONS

"How to Restrict Extranet User Accessing Teamsite," Microsoft Office 365 Community, 2012, http://community.office365.com/en-us/forums/152/p/23390/111558.aspx#111558.

Ronald J. Degen, "Social Network Driven Innovation," International School of Management Paris, 2009, pp. 1-39, http://globadvantage.ipleiria.pt/files/2009/10/working_paper-47_globadvantage.pdf.

Office Action for U.S. Appl. No. 14/063,962 dated Oct. 14, 2015, pp. 1-24.

Office Action for U.S Appl. No. 14/063,962 dated Mar. 14, 2016, pp. 1-16.

Office Action for U.S Appl. No. 14/063,962 dated Aug. 10, 2016, pp. 1-19.

* cited by examiner

Start a Community

- 401 — *Name: ProjectNewLook
- 402 — Tags: productline
- 403 — Web Address: http://connections.swg.usma.ibm.com/communities/community/

Enter a short name to customize the link, or leave blank.

- 404 — *Access:
  - ○ Public – anyone can join
  - ○ Moderated – people must request to join
  - ◉ Restricted – People must be invited to join

- 405 — ☑ Allow members outside of Renovations
- 406 — ○ Allow members from all organizations outside of Renovations
- 406 — ◉ Allow members from only the following organizations outside of Renovations

- 408 — Type to filter this list

- 407 —
  | ☑ AlphaBank | ☐ Another organization |
  | ☐ Another organization | ☐ Another organization |
  | ☐ Another organization | ☐ Another organization |
  | ☐ Another organization | ☐ Another organization |
  | ☐ Another organization | ☐ Another organization |
  | ☐ Another organization | ☐ Another organization |
  | ☐ Another organization | ☐ Another organization |

Select a role and add people to that role.

⚠ Note: All community content and members will be visible to people outside of Renovations.

- 409 — Members ▾ | Type to find person
- 410 — Samantha Fox ✕ | Samantha Smith ✕

FIG. 4

CONTROLLING WHICH USERS FROM AN ORGANIZATION ARE TO BE PART OF A COMMUNITY SPACE IN AN EASY AND ERROR-FREE MANNER

TECHNICAL FIELD

The present invention relates generally to social network services, and more particularly to controlling which users from an organization are to be part of a community space in an easy and error-free manner.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

In a multi-tenant social networking environment, where a tenant is an organization, a user of an organization may want to share content with other organizations. For example, when a user desires to share content with other organizations, the user may have to explicitly enter the name of each individual of the organization to receive the shared content. However, by manually entering the name of each individual to receive the shared content, errors can result, such as mistyping a name or an e-mail, thereby resulting in an improper person receiving the shared content.

An alternative approach to sharing content with other organizations involves using Lightweight Directory Access Protocol (LDAP) groups. However, these LDAP groups are fixed lists of users, possibly from an organization, and do not allow the user to specifically control which users from the fixed list of users can receive the shared content. Furthermore, these LDAP groups do not indicate the organizations of the listed users. Hence, the user does not know the organization of a user listed in the LDAP group.

Hence, a user cannot currently control which users from an organization are to be part of a community space in an easy and error-free manner.

BRIEF SUMMARY

In one embodiment of the present invention, a method for controlling which users from an organization are to be part of a community space comprises receiving an indication to create a community space from a user. The method further comprises providing a list of organizations authorized to collaborate with an organization of the user. Additionally, the method comprises receiving a selection of one or more organizations from the list of organizations authorized to collaborate with the organization of the user. Furthermore, the method comprises creating a community space scoped to the selected one or more organizations. The method further comprises providing a list of one or more users who are members of the selected one or more organizations to engage in a collaborative activity with the user in the community space. The method additionally comprises receiving a selection of one or more users from the list of one or more users. In addition, the method comprises adding, by a processor, the selected one or more users to the community space.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 4 is a screen shot of a user interface for creating a community space, where the user can easily control which users from an organization are to be part of the created community space using the principles of the present invention in accordance with an embodiment of the present invention.

DETAILED DESCRIPTION

The present invention comprises a method, system and computer program product for controlling which users from an organization are to be part of a community space. In one embodiment of the present invention, a community collaboration mechanism provides a list of organizations authorized to collaborate with the organization of the user in response to receiving an indication to create a community space from the user. The community collaboration mechanism receives from the user a selection of organizations from the list of organizations authorized to collaborate with the organization of the user. A community space is then created that is scoped to the selected organizations. Upon receiving indication(s) (e.g., an e-mail address, a list of e-mail addresses, a login name, a user identifier, and a portion of a name to be used by a "typeahead" feature) of one or more users to be added to the community space, the community collaboration mechanism provides a list of users who are members of the user selected organizations to engage in a collaborative activity with the user in the community space based on these indication(s). The community collaboration mechanism will not list any users that are not members of these selected organizations. The community collaboration mechanism then receives a selection of users from this list of users and adds those users to the community space. In this manner, the user can control which users from an organization are to be part of a community space in an easy and error-free manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
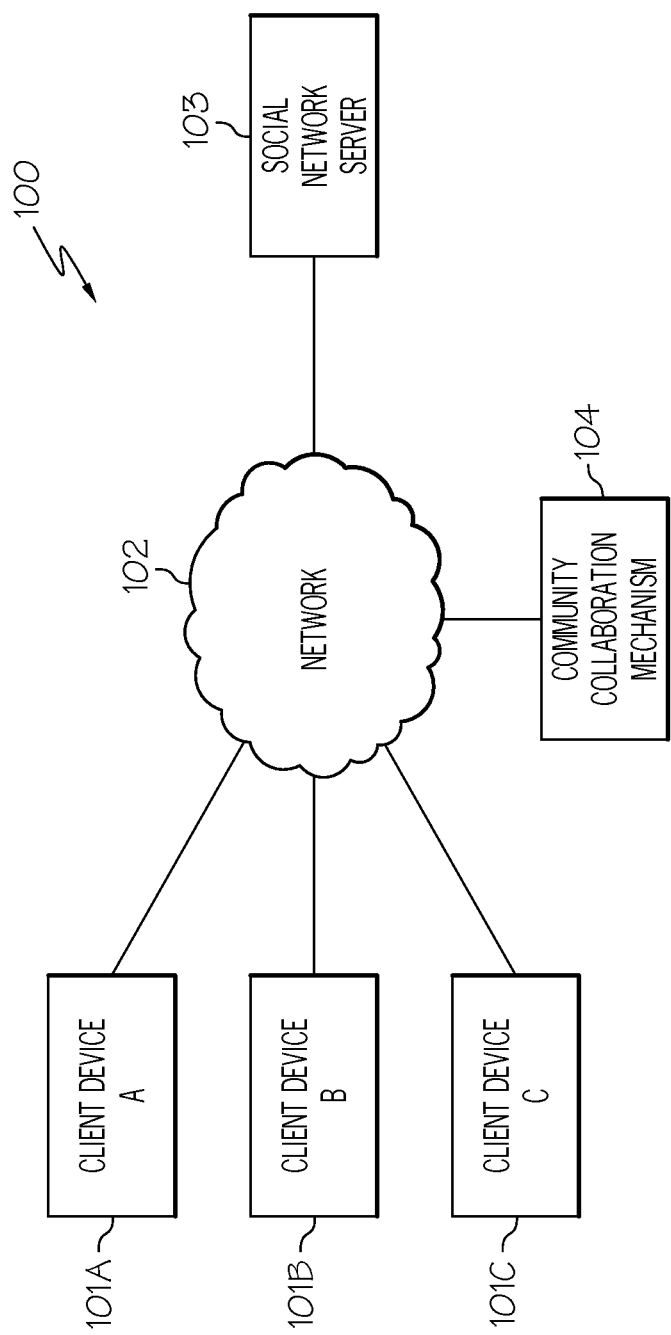
FIG. 1 illustrates a multi-tenant social network system configured in accordance with an embodiment of the present invention.

Referring now to the Figures in detail, FIG. 1 illustrates a multi-tenant social network system 100 configured in accordance with an embodiment of the present invention. Referring to FIG. 1, social network system 100 includes a community of users of various enterprises (tenants) using client devices 101A-101C (identified as "Client Device A," "Client Device B," and "Client Device C," respectively, in FIG. 1) to be involved in multi-tenant social network system 100. Client devices 101A-101C may collectively or individually be referred to as client devices 101 or client device 101, respectively. Each user of client device 101 may be a worker/employee for a unique enterprise or multiple users of client devices 101 may be workers/employees for the same enterprise. For example, users of client devices 101A-101B may be workers/employees for the same enterprise while the user of client device 101C is a worker/employee of a different enterprise. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. Social network server 103, as used herein, is configured to enable various collaborative activities as discussed herein. While FIG. 1 illustrates a single social network server 103, it is noted for clarity that multiple servers may be used to implement the social networking and/or microblogging service.

System 100 further includes a community collaboration mechanism 104 connected to network 102 by wire or wirelessly. Community collaboration mechanism 104 is configured to allow a user to control which users from an organization are to be part of a community space in an easy and error-free manner as discussed in further detail below. A description of the hardware configuration of community collaboration mechanism 104 is provided below in connection with FIG. 2.

System 100 is not to be limited in scope to any one particular network architecture. System 100 may include any number of clients 101, networks 102, social network servers 103 and community collaboration mechanisms 104. Furthermore, in one embodiment, community collaboration mechanism 104 may be part of social network server 103.

Figure 2:
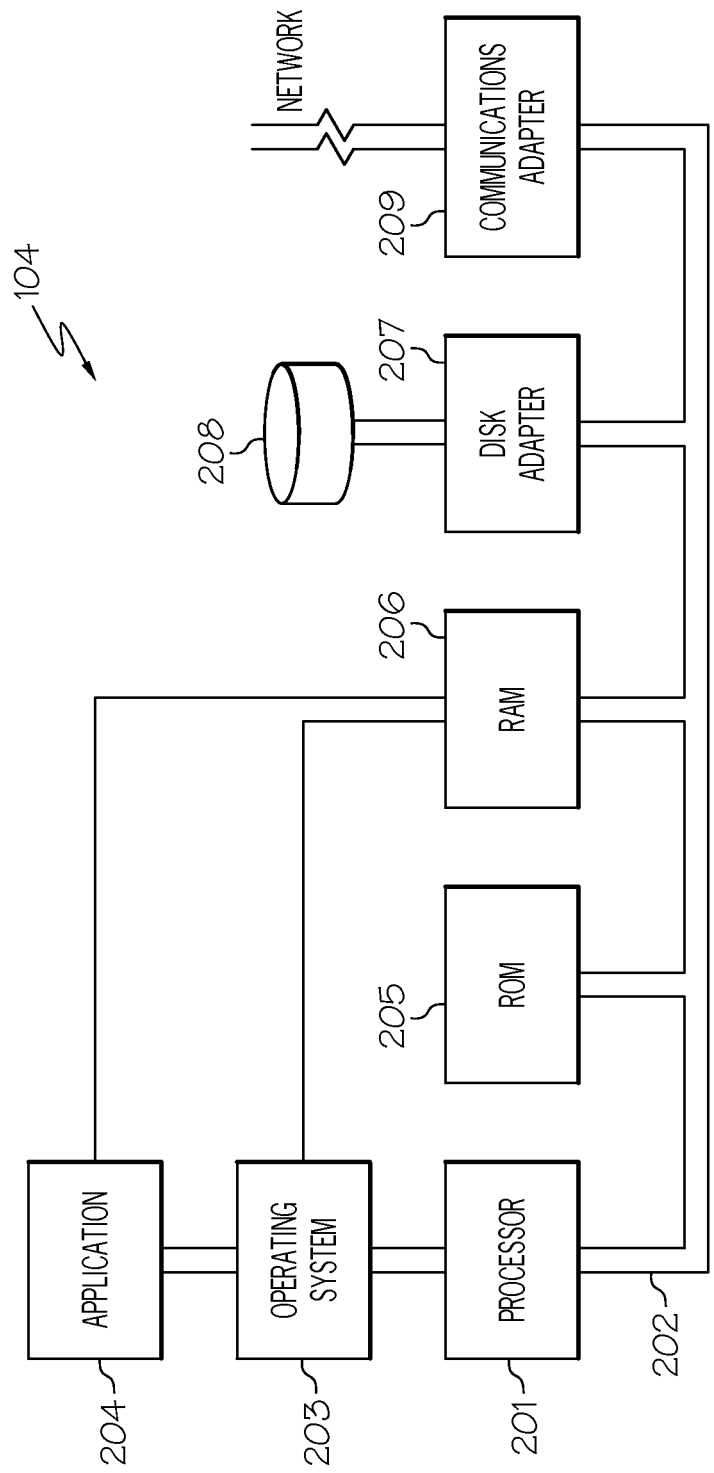
FIG. 2 illustrates a hardware configuration of a community collaboration mechanism configured in accordance with an embodiment of the present invention.

Referring now to FIG. 2, FIG. 2 illustrates a hardware configuration of a community collaboration mechanism 104 (FIG. 1) which is representative of a hardware environment for practicing the present invention. Referring to FIG. 2, community collaboration mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for allowing a user to control which users from an organization are to be part of a community space in an easy and error-free manner, as discussed further below in association with FIGS. 3-5.

Referring again to FIG. 2, read-only memory ("ROM") 205 is coupled to system bus 202 and includes a basic input/output system ("BIOS") that controls certain basic functions of community collaboration mechanism 104. Random access memory ("RAM") 206 and disk adapter 207 are also coupled to system bus 202. It should be noted that software components including operating system 203 and application 204 may be loaded into RAM 206, which may be community collaboration mechanism's 104 main memory for execution. Disk adapter 207 may be an integrated drive electronics ("IDE") adapter that communicates with a disk unit 208, e.g., disk drive. It is noted that the program for allowing a user to control which users from an organization are to be part of a community space in an easy and error-free manner, as discussed further below in association with FIGS. 3-5, may reside in disk unit 208 or in application 204.

Community collaboration mechanism 104 may further include a communications adapter 209 coupled to bus 202. Communications adapter 209 interconnects bus 202 with an outside network (e.g., network 102 of FIG. 1) thereby allowing community collaboration mechanism 104 to communicate with client devices 101 and social network server 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, in a multi-tenant social networking environment, where a tenant is an organization, a user of an organization may want to share content with other organizations. For example, when a user desires to share content with other organizations, the user may have to explicitly enter the name of each individual of the organization to receive the shared content. However, by manually entering the name of each individual to receive the shared content, errors can result, such as mistyping a name or an e-mail, thereby resulting in an improper person receiving the shared content. An alternative approach to sharing content with other organizations involves using Lightweight Directory Access Protocol (LDAP) groups. However, these LDAP groups are fixed lists of users, possibly from an organization, and do not allow the user to specifically control which users from the fixed list of users can receive the shared content. Furthermore, these LDAP groups do not indicate the organizations of the listed users. Hence, the user does not know the organization of a user listed in the LDAP group. Hence, a user cannot currently control which users from an organization are to be part of a community space in an easy and error-free manner.

Figure 3:
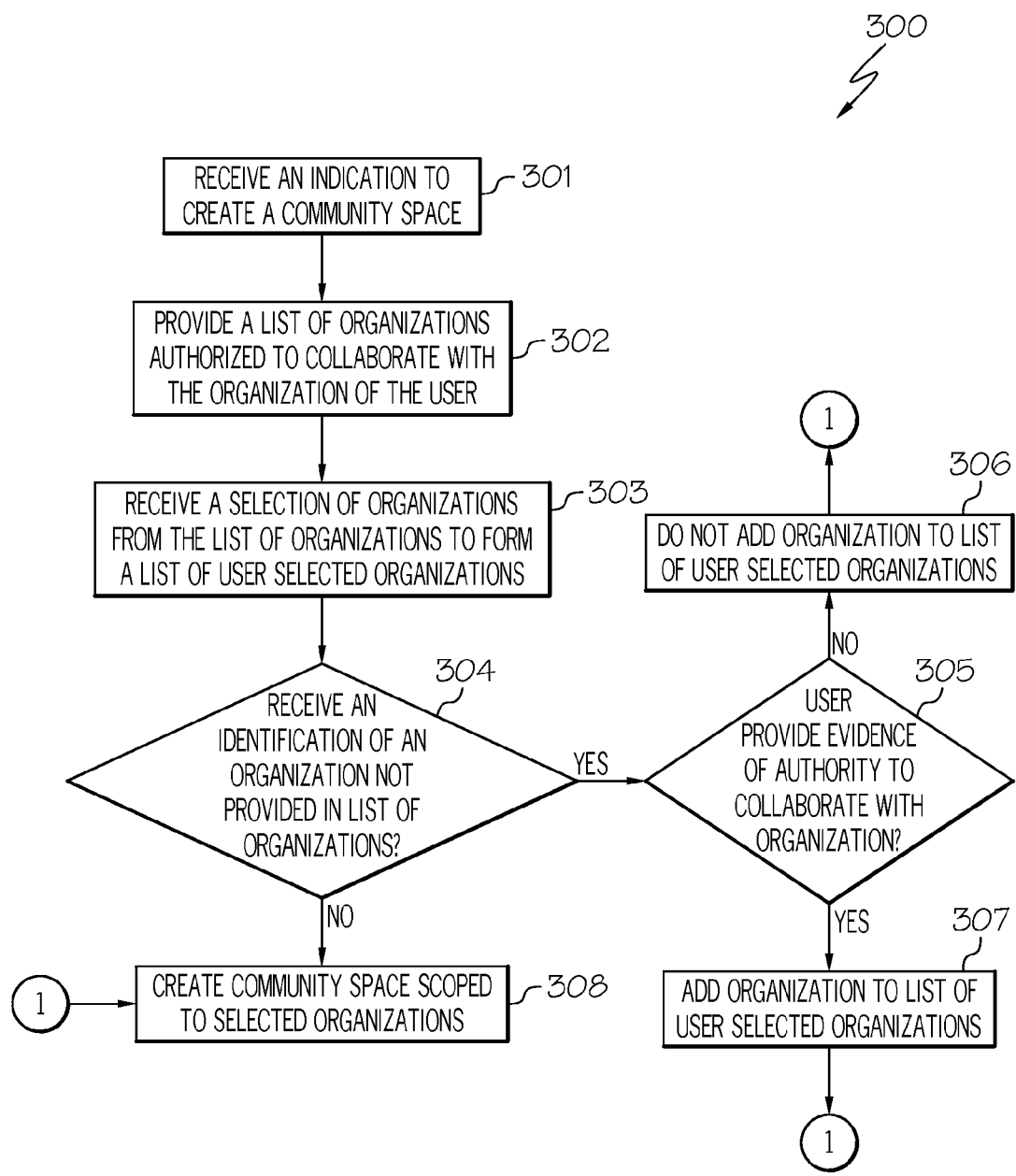
FIG. 3 is a flowchart of a method for creating a community space scoped to organizations selected by the user in accordance with an embodiment of the present invention.
Figure 5:
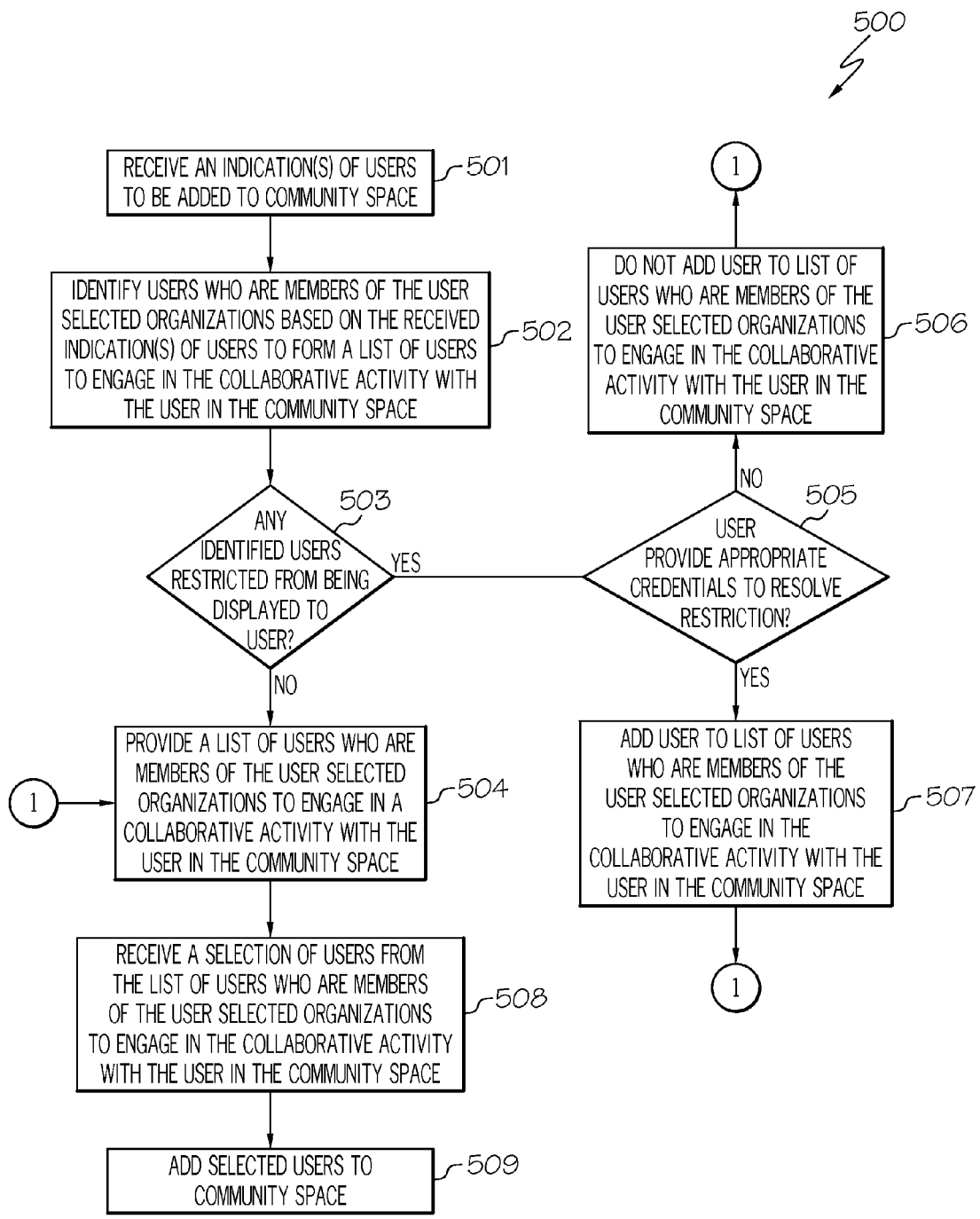
FIG. 5 is a flowchart of a method for controlling which users from the organizations selected by the user are to be part of the created community space in an easy and error-free manner in accordance with an embodiment of the present invention.

The principles of the present invention provide a means for allowing a user to control which users from an organization are to be part of a community space in an easy and error-free manner as discussed further below in association with FIGS. 3-5. FIG. 3 is a flowchart of a method for creating a community space scoped to organizations selected by the user. FIG. 4 is a screen shot of a user interface on client device 101 (FIG. 1) for creating a community space, where the user can easily control which users from an organization are to be part of the created community space using the principles of the present invention. FIG. 5 is a flowchart of a method for controlling which users from the organizations selected by the user are to be part of the created community space in an easy and error-free manner.

As stated above, FIG. 3 is a flowchart of a method 300 for creating a community space scoped to organizations selected by the user in accordance with an embodiment of the present invention.

Referring to FIG. 3, in conjunction with FIGS. 1-2, in step 301, community collaboration mechanism 104 receives an indication from a user, such as a community manager, of client device 101 to create a community space.

In step 302, community collaboration mechanism 104 provides to the user of client device 101 a list of organizations authorized to collaborate with the organization of the user as illustrated in FIG. 4. FIG. 4 is a screen shot of a user interface 400 on client device 101 for creating a community space, where the user can easily control which users from an organization are to be part of the created community space in accordance with an embodiment of the present invention.

As illustrated in FIG. 4, the user can define the created community space in various manners, such as the name 401 of the created community, the topic 402 of the created community, the web address 403 of the created community, and the type of access 404 for the created community (e.g., public, moderated and restricted). Furthermore, the user can indicate at box 405 whether to allow visitors to participate in the community. As illustrated in FIG. 4, the user has indicated to allow visitors to participate in the community. Furthermore, the user can indicate at circles 406 whether to allow members from all organizations or selected organizations outside of the organization of the user (in the illustrative embodiment of FIG. 4, the organization of the user is "Renovations"). As illustrated in FIG. 4, the user has indicated to allow members from selected organizations outside of the organization of the user. As further illustrated in FIG. 4, the user is presented with a list 407 of organizations authorized to collaborate with the organization of the user. In one embodiment, the user may be provided an option to filter the list of organizations authorized to collaborate with the organization of the user by inputting keyword(s) in a text box 408.

Returning to FIG. 3, in conjunction with FIGS. 1-2 and 4, in step 303, community collaboration mechanism 104 receives from the user a selection of organizations from the list of organizations to form a list of user selected organizations as illustrated in FIG. 4. Referring to FIG. 4, FIG. 4 illustrates that the user has selected the organization of "AlphaBank" from the list of organizations in list 407.

In step 304 of FIG. 3, a determination is made by community collaboration mechanism 104 as to whether it received an identification (e.g., name) of an organization not provided in the list of organizations. For example, an organization may have concerns regarding its privacy and may not allow its organization to be listed. As a result, the user may have to provide evidence of authority to collaborate with the non-listed organization.

If the user provided a non-listed organization to collaborate with the organization of the user, then, in step 305, a determination is made by community collaboration mechanism 104 as to whether the user provided evidence of authority to collaborate with the non-listed organization.

If the user did not provide any evidence of authority to collaborate with the non-listed organization, then, in step 306, community collaboration mechanism 104 does not add the non-listed organization to the list of user selected organizations authorized to collaborate with the organization of the user.

If, however, the user did provide evidence of authority to collaborate with the non-publicly listed organization, then, in step 307, community collaboration mechanism 104 adds the non-listed organization to the list of user selected organizations authorized to collaborate with the organization of the user.

If community collaboration mechanism 104 did not receive a non-listed organization to collaborate with the organization of the user, or upon not adding a non-listed organization to the list of user selected organizations in step 306, or upon adding a non-listed organization to the list of user selected organizations in step 307, then, in step 308, community collaboration mechanism 104 creates a community space scoped to the user selected organizations (i.e., creates a community space scoped to those organizations listed in the list of user selected organizations).

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Upon creating the community space, users may be added to the community space that are members of the scoped organizations in an easy and error-free manner as discussed below in connection with FIG. 5.

FIG. 5 is a flowchart of a method 500 for controlling which users from the organizations selected by the user are to be part of the created community space in an easy and error-free manner in accordance with an embodiment of the present invention.

Referring to FIG. 5, in conjunction with FIGS. 1-2 and 4, in step 501, community collaboration mechanism 104 receives an indication(s) (e.g., an e-mail address, a list of e-mail addresses, a login name, a user identifier, and a portion of a name to be used by a "typeahead" feature) of users to be added to the community space. For example, as illustrated in FIG. 4, the user may input the name or a portion of a name of a member to be added to the community space in text box 409. For example, the user may type in the name of "Samantha" and the "typeahead" feature will return all members with the name of "Samantha," such as "Samantha Smith" (a "Renovations" employee) and "Samantha Fox" (an "AlphaBank" employee), but would not return the name of "Samantha Jones," who is an employee of "AlphaChocolates," even though she is in the network of the user. In this manner, the typeahead feature will only return the user names for only those members that are in the user's organization as well as the organizations selected by the user to be part of the community space.

In step 502, community collaboration mechanism 104 identifies the users who are members of the user selected organizations based on the received indication(s) of users to form a list of users to engage in the collaborative activity (e.g., chatting, an online meeting, data sharing, a forum and a wiki) with the user in the community space. For instance, referring to the example above, the "typeahead" feature will return all members with the name of "Samantha," such as "Samantha Smith" (a "Renovations" employee) and "Samantha Fox" (an "AlphaBank" employee), but would not return the name of "Samantha Jones," in response to the user entering a portion of a full name (e.g., "Samantha").

In step 503, a determination is made by community collaboration mechanism 104 as to whether any users from the identified set of users are restricted from being displayed to the user. An organization may have privacy concerns and may not want to expose people in their organization. In such a case, community collaboration mechanism 104 may require the user to resolve the restriction by providing appropriate credentials, such as by providing a full e-mail address of the restricted user.

If there are no users from the identified set of users that are restricted from being displayed to the user, then, in step 504, collaboration mechanism 104 provides a list of users who are members of the user selected organizations to engage in a collaborate activity with the user in the community space as illustrated in FIG. 4. Referring to FIG. 4, FIG. 4 illustrates various boxes 410 listing individual users from the selected organizations to engage in a collaborate activity with the user in the community space. In one embodiment, if the user decides to not include one of these users in the community space, the user may deselect the user by closing the box 410.

Returning to step 503, if there is a user from the identified set of users that is restricted from being part of the community space, then, in step 505, collaboration mechanism 104 determines whether the user provided appropriate credentials to resolve the restriction.

If the user does not provide appropriate credentials to resolve the restriction, then, in step 506, collaboration mechanism 104 does not add the user to the list of users who are members of the user selected organizations to engage in the collaborative activity with the user in the community space.

If, however, the user does provide appropriate credentials to resolve the restriction, then, in step 507, collaboration mechanism 104 adds the user to the list of users who are members of the user selected organizations to engage in the collaborative activity with the user in the community space.

Upon not adding the user to the list of users who are members of the user selected organizations in step 506 or upon adding the user to the list of users who are members of the user selected organizations in step 507, community collaboration mechanism 104 provides the list of users who are members of the selected organizations to engage in a collaborate activity with the user in the community space in step 504.

Upon providing the list of users who are members of the selected organizations to engage in a collaborate activity with the user in the community space, community collaboration mechanism 104 receives a selection of users from the list of users who are members of the user selected organizations to engage in the collaborative activity with the user in the community space in step 508.

In step 509, community collaboration mechanism 104 adds the selected users to the community space.

In this manner, the user can control which users from an organization are to be part of a community space in an easy and error-free manner.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for controlling which users from an organization are to be part of a community space, the computer program product comprising the programming instructions for:
   receiving an indication to create a community space from a user via a user interface;
   providing a list of organizations authorized to collaborate with an organization of said user;
   receiving a selection of at least one organization from said list of organizations authorized to collaborate with said organization of said user;
   creating a community space scoped to said selected at least one organization;
   receiving at least one indication of users to be added to said community space via a typeahead feature, wherein said at least one indication is selected from the group consisting of a login name, an e-mail address, a list of e-mail addresses, and a portion of a name;
   identifying users who are members of said at least one organization based on said received at least one indication to form a first list of users to engage in a collaborative activity with said user in said community space;
   determining whether any users from said first list of users are restricted from being displayed to said user;
   providing a second list of users who are members of said selected at least one organization to engage in said collaborative activity with said user in said community space who are not restricted from being displayed to said user or if restricted from being displayed to said user, said restriction being resolved by said user providing appropriate credentials;
   receiving a selection of at least one user from said second list of users; and
   adding said selected at least one user to said community space.

2. The computer program product as recited in claim 1 further comprising the programming instructions for:
   receiving an identification of an organization not provided in said list of organizations; and
   adding said organization to a list of selected organizations authorized to collaborate with said organization of said user in response to said user providing evidence of authority to collaborate with said organization.

3. The computer program product as recited in claim 1 further comprising the programming instructions for:
   identifying a user from said first list of users who is restricted from being displayed to said user; and
   adding said user to said second list of users who are members of said selected at least one organization to engage in said collaborative activity with said user in said community space in response to said restriction being resolved by said user providing appropriate credentials.

4. The computer program product as recited in claim 3, wherein said appropriate credentials comprise an e-mail address of said user who is a member of said selected at least one organization.

5. The computer program product as recited in claim 1, wherein said collaborative activity is selected from the group consisting of chatting, an online meeting, data sharing, a forum and a wiki.

6. A system, comprising:
   a memory unit for storing a computer program for controlling which users from an organization are to be part of a community space; and
   a processor coupled to said memory unit, wherein said processor is configured to execute the program instructions of the computer program comprising:
      receiving an indication to create a community space from a user via a user interface;
      providing a list of organizations authorized to collaborate with an organization of said user;

receiving a selection of at least one organization from said list of organizations authorized to collaborate with said organization of said user;

creating a community space scoped to said selected at least one organization;

receiving at least one indication of users to be added to said community space via a typeahead feature, wherein said at least one indication is selected from the group consisting of a login name, an e-mail address, a list of e-mail addresses, and a portion of a name;

identifying users who are members of said at least one organization based on said received at least one indication to form a first list of users to engage in a collaborative activity with said user in said community space;

determining whether any users from said first list of users are restricted from being displayed to said user;

providing a second list of users who are members of said selected at least one organization to engage in said collaborative activity with said user in said community space who are not restricted from being displayed to said user or if restricted from being displayed to said user, said restriction being resolved by said user providing appropriate credentials;

receiving a selection of at least one user from said second list of users; and adding said selected at least one user to said community space.

7. The system as recited in claim 6, wherein the program instructions of the computer program further comprise:
receiving an identification of an organization not provided in said list of organizations; and
adding said organization to a list of selected organizations authorized to collaborate with said organization of said user in response to said user providing evidence of authority to collaborate with said organization.

8. The system as recited in claim 6, wherein the program instructions of the computer program further comprise:
identifying a user from said first list of users who is restricted from being displayed to said user; and
adding said user to said second list of users who are members of said selected at least one organization to engage in said collaborative activity with said user in said community space in response to said restriction being resolved by said user providing appropriate credentials.

9. The system as recited in claim 8, wherein said appropriate credentials comprise an e-mail address of said user who is a member of said selected at least one organization.

10. The system as recited in claim 6, wherein said collaborative activity is selected from the group consisting of chatting, an online meeting, data sharing, a forum and a wiki.

* * * * *